Feb. 17, 1959  A. L. PRENTICE  2,873,825
BRAKE SHOE KEYS
Filed Nov. 22, 1955  2 Sheets-Sheet 2
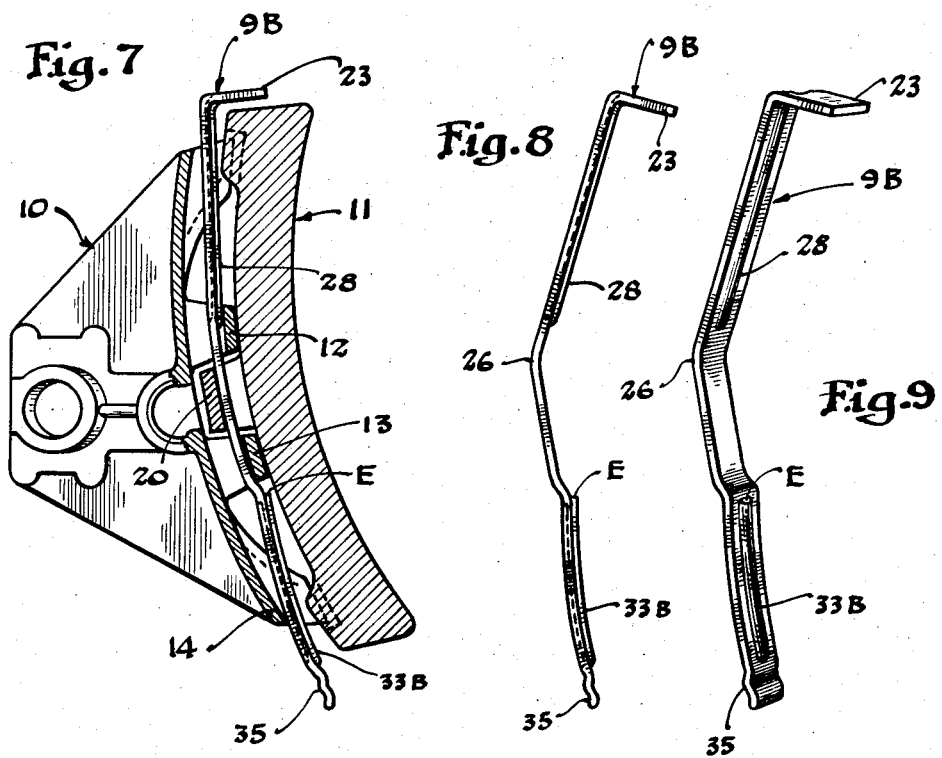
Inventor
Allan L. Prentice
By Wallace and Cannon
Attorneys

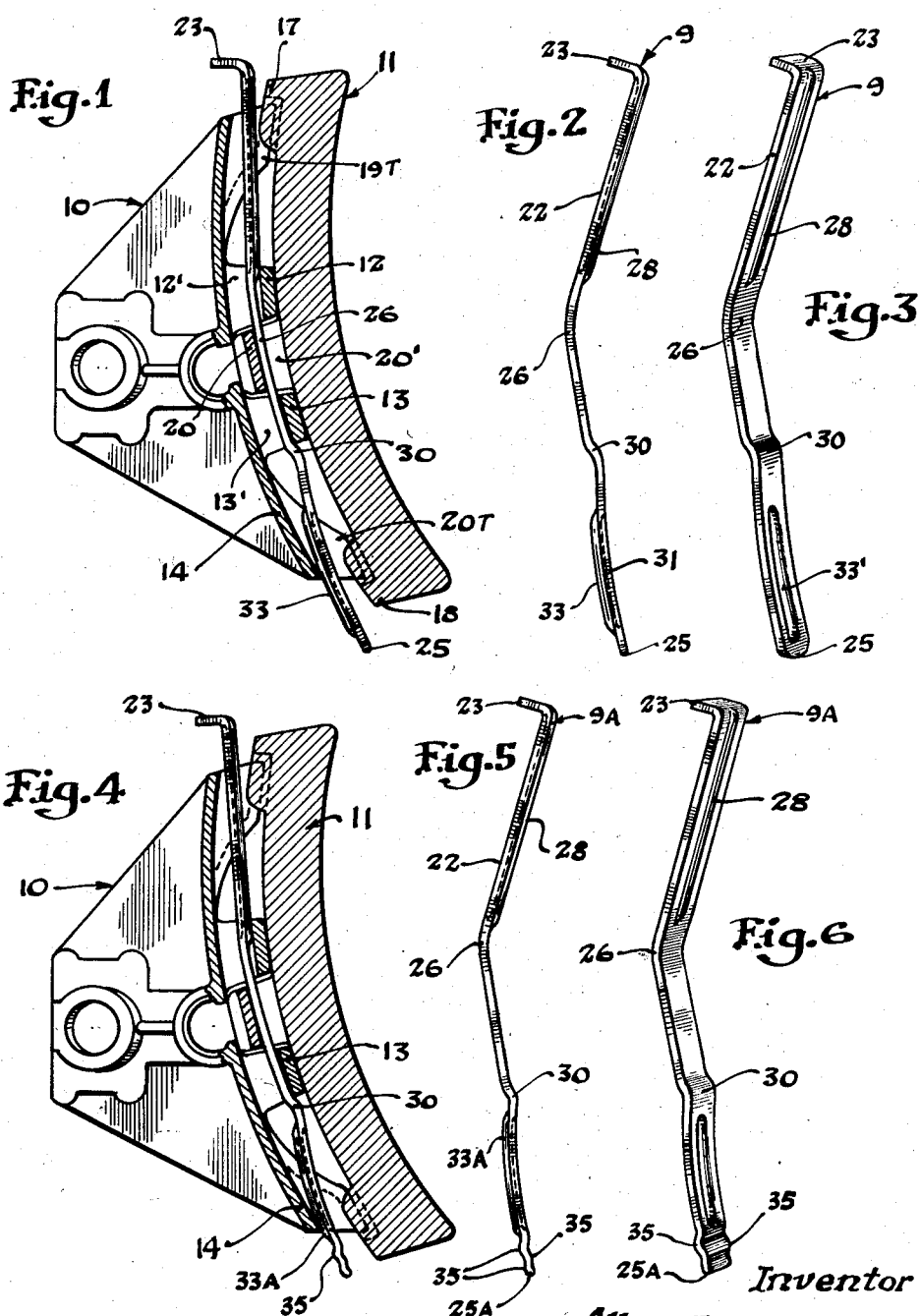

United States Patent Office 2,873,825
Patented Feb. 17, 1959

2,873,825
BRAKE SHOE KEYS

Allan L. Prentice, New York, N. Y., assignor to American Brake Shoe Company, New York, N. Y., a corporation of Delaware Application November 22, 1955, Serial No. 548,384

3 Claims. (Cl. 188—243)

This invention relates to a key for securing a brake shoe to a brake head.

Brake shoes of the kind used for breaking railway equipment are conventionally attached to a brake head which is supported at one end of a brake beam to be disposed adjacent to the tread of the car wheel, and such attachment is attained by a removable key that enables the shoe to be removably or detachably associated with the brake head.

It is, of course essential that the key be capable of holding the parts together under the most severe braking or operating conditions to be encountered, and in view of this the key is of arcuate form and is composed of spring steel so as to enable strong holding forces to be exerted when the key is in operative position. Thus, the shoe and the head are provided with complemental parts which in associated relation afford a keyway for the key, and during insertion of the key a relatively heavy impact is delivered to the key head to position the same in retaining position. The arcuate nature of the key affords a tight engagement between opposing parts of the shoe and the brake head. In order to remove the key it is necessary to apply a relatively sharp and strong blow to the exposed end of the key, that is, the end opposite the key head. The primary objects of the present invention are to facilitate removal of the key in the aforementioned manner, and conversely to facilitate insertion and retention of the key in operative position coupling the brake shoe and the brake head. A further object of the present invention is to equip a brake shoe key with positive lock means for holding the key in place in the event there is failure to initially drive the key fully home between the coupled parts.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is a sectional view through a brake shoe and brake head connected by a key constructed in accordance with the present invention;

Fig. 2 is a side elevational view of the key shown in Fig. 1;

Fig. 3 is a rear perspective view of the key shown in Fig. 2;

Fig. 4 is a sectional view similar of Fig. 1 showing a modified form of key;

Fig. 5 is a side elevational view of the modified key of Fig. 4;

Fig. 6 is a rear perspective view of the modified key of Fig. 5;

Fig. 7 is a sectional view similar to Fig. 1 showing another modified key;

Fig. 8 is a side elevational view of the modified key shown in Fig. 7; and

Fig. 9 is a rear perspective view of the key shown in Fig. 8.

The present invention as illustrated in Figs. 1, 2 and 3 is embodied in a brake shoe key 9, and this key is adapted to be inserted into a keyway afforded by cooperating parts of a brake head 10 and an associated brake shoe 11. The brake head 10 and shoe 11 are of conventional construction. Thus, the head 10 is provided with a pair of spaced apart U-shaped lugs 12 and 13 which project from the forward face or side of an arcuate plate 14 that is integral with the head. The lugs 12 and 13 afford aligned openings 12' and 13'.

The shoe 11 is arcuate in form as will be observed in Fig. 1, and projecting from the arcuate back thereof opposite the plate 14 on the head 10 are a pair of end stops 17 and 18. Cooperating with the end stops 17 and 18 are toe guides 19T and 20T at corresponding ends of the head 10. Formed medially on the back of the shoe is a U-shaped attaching lug 20, and a portion of the opening 20' afforded by this lug is adapted to be aligned with the openings 12' and 13' afforded by the lugs 12 and 13 that project from the head 10. These aligned openings afford a keyway for the key 9.

As shown in Figs. 2 and 3, the key 9 includes an elongated shank 22 composed of spring steel and which is relatively flat in cross section. At one end, the key 9 includes a head 23 which is bent at right angles to the shank 22.

Intermediate the key head 23 and the opposite end 25 of the key, the key is bowed so as to provide an arcuate portion 26, and this arcuate portion of the key is adapted to engage the inner face of the base of the lug 20 as shown in Fig. 1. Between the arcuate portion 26 and the head 23 of the key, a rib 28 is provided for the purpose explained in my U. S. Patent No. 2,138,196. Adjacent one end of the arcuate portion 26 of the key, the shank of the key is provided with an angled offset portion 30, and this offset portion 30, when the key is in fully inserted position as shown in Fig. 1, engages the lower end of the lug 13 of the brake head. The shank 22 of the key 9 is made slightly arcuate in the portion 31 that is between the offset 30 and the end 25 of the key, and this portion 31 of the key is provided with an elongated rib 33 on the side thereof corresponding to the plate 14 of the brake head 10. It will be observed in Fig. 3 that the ribs 28 and 33 are each preferably provided by embossing the shank of the key, such procedure resulting in depressions as 33' on the side of the key opposite the corresponding rib such as the rib 33.

To insert the key into operative position, the key is initially positioned so that the end 25 thereof is aligned with the passage between the end stop 17 of the shoe and the opposing face of the plate 14, whereupon the key is then pushed forwardly so that the end 25 thereof is reposed at least in part in the aforementioned keyway afforded by the openings in the lugs 12, 13, and 20. After such initial positioning of the key has been attained, the head 23 of the key is then struck forcefully to drive the key forward during which time the end 25 rides on and forcefully engages the face of the plate 14 that is opposite the back of the shoe 11. This is an incident to the key 9 being compressed in the keyway. Thus, the arcuate portion 26 is flattened out by engagement thereof with the lug 20 during driving of the key. This flexes the end portion 25 of the key forcefully against the face of the plate 14, and this establishes a tight fit of the key 9 between the lug 20 and the plate 14, and between the lug 20 and the opposed lugs 12 and 13.

It is desirable that the driving of the key 9 be accomplished expeditiously and in an accurate and effective manner and, inasmuch as the space about the car wheel where installation is made is not overly commodious, the rib 33 is provided. Thus, the rib 33 in effect reduces the area of the key that engages the plate 14 on the head 10. In this way, a guide is in effect afforded which assures that alignment of the key is maintained, thereby eliminating the need for dexterity in driving the key home. But what is more important is that the rib 33 also facilitates removal of the key 9 by a blow delivered to the exposed or entering end 25 of the key 9 positioned as in Fig. 1. Thus, the rib 33 in this regard serves to stabilize the end portion 25 of the key against vibration when the removing blow is applied so that the force of the applied blow is more effectively concentrated along the length of the key shank, and in view of the narrow working confines that are present at the car wheel it will be appreciated that provision of the rib 33 with the incident advantages mentioned represents a significant improvement.

To assure further that the brake shoe key is retained in position against accidental displacement, the end opposite the head 23 may be advantageously provided with lock teeth or serrations adapted to engage the adjacent end edge of the plate 14 when the key is in retaining position. The key 9A, Figs. 4, 5 and 6, is so constructed. Thus, the end portion 25A opposite the head 23 of the key 9A is provided with a series of serrations 35. The rib 33A at the entering end of the key is in this instance of somewhat shorter length as compared to the corresponding rib 33 described above. Otherwise the key 9A is identical in construction to what was described above. When the key 9A is properly inserted as shown in Fig. 4, it will be observed that the serrations 35 are disposed somewhat beyond the end of the plate 14 that is engaged by the rib 33A. As a consequence of this, the serrations 35 constitute end abutments on the key 9A serving to prevent displacement of the key 9A in the event that conditions are such as to tend to cause the key 9A to slide or creep toward the end lug 17.

Another modified form of the key is shown in Figs. 7 to 9 of the drawings, and in this instance the rib used to rigidify the key against vibration during removal of the key from the coupled parts is provided on the reverse side of the key. Thus, the key 9B is provided having a rib 33B projecting from the side of the key opposite the plate 14 of the brake shoe head. The lower end of the key 9B, that is, the end that is to be impacted upon removal of the key during disassociation of the brake head and the brake shoe is preferably provided with serrations 35 for the purpose mentioned above in connection with the key 9A.

The rib 33B in this instance may be used advantageously to provide a positive lock. In achieving this, the end of the rib 33B which is opposite the serrations 35 is formed with a right angle, and this provides a sharp end E engageable with the lower edge of the lug 13 of the brake head. Such assures that the key 9B will not be displaced even if the key is not driven home to the extent that fully develops the compressibility of the key afforded by the arcuate back 26 thereof.

In certain instances it is of advantage to lift the head of the key by a suitable tool acting between the key and the brake shoe 11. This can be accomplished by reversing the head 23 of the key relative to the head, of the key 9A as shown in Figs. 7 to 9 so that the head 23 of the key 9B is normally positioned over the upper end of the brake shoe 11 just sufficiently to enable the end of a suitable tool to be disposed between the head 23 and the upper end of the shoe 11.

The real purpose of the ribs 33, 33A and 33B can be realized from the standpoint of the assembled parts. Thus, each such rib is of narrow elongated form and at one end commences at a point spaced from the inner edges of each lug 13 that is, the one of the two lugs nearer the rib, and extends at least to the outer edge of the plate 14, that is, the outer edge of the plate 14 opposite the head 23 of the key. In the form of the invention shown in Figs. 1 and 4, the ribs 33 and 33A are on the convex side of the medial arcuate portions 26 of the keys 9 and 9A so as to actually engage the outer edge of the plate 14 and be guided thereby.

It will be seen that in accordance with the present invention, there is afforded a brake shoe key which takes into account the relatively narrow working confines about the car wheel where a brake shoe is to be removably connected to a brake head, the construction herein set forth being adapted to facilitate removal of the key as an incident to a blow applied to lower or projecting end of the key. Moreover, a brake shoe key is afforded wherein the rib used to rigidify the key against vibration also serves to afford a sharp edge providing a positive lock preventing accidental displacement of the key.

Hence, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. In a railroad brake assembly including a brake head member and a brake shoe member, and wherein the brake head member includes a plate with opposed outer end edges and formed with U-shaped lugs having key-way defining openings and outermost edges and innermost edges projecting from the plate in spaced relation, and wherein the brake shoe member is provided with an attaching lug having an opening therein disposed between the first-named lugs with all of said openings aligned to afford a key-way; a brake shoe key disposed in part in said key-way and coupling said members and comprising an elongated shank having at one end a generally right-angled head adjacent one of said outer end edges of said plate and adapted to be impacted to drive the key into said key-way, said shank in the unmounted state of the key having an arcuate portion medially located between the ends thereof and said arcuate portion in the assembly being under compression in said key-way and at least partly straightened out in said key-way with solid surfaces thereof respectively tightly engaging surfaces of said lugs to tightly couple said members, the end portion of said key shank beyond said medial portion and opposite the head of the key having a free end displaced beyond the other of the outer end edges of said plate, and said end portion of the key shank being formed with a narrow elongated rib projecting outwardly of the plane of the key shank, and said rib commencing at one end outwardly of the innermost edge of that lug on the plate which is nearer said end portion of the key shank and terminating at an opposite end disposed outwardly of said other of the end edges of said plate, said rib thereby imparting rigidity to said end portion of the key and facilitating removal of the key by a blow delivered to said displaced end of the key.

2. An assembly according to claim 1 wherein said rib is on the convex side of said arcuate portion of the key shank and is engaged with said other of the outer end edges of said plate.

3. An assembly according to claim 1 wherein the end of the key displaced beyond said other of the outer end edges of said plate is formed with serrations constituting abutments serving to limit displacement of the key from said key-way.

References Cited in the file of this patent

UNITED STATES PATENTS

| | | |
|---|---|---|
| 1,927,248 | Trainer | Sept. 19, 1933 |
| 2,051,909 | Schaefer | Nov. 9, 1935 |
| 2,107,768 | Schaefer | Feb. 8, 1938 |
| 2,138,196 | Prentice | Nov. 29, 1938 |